United States Patent
Koutyrine et al.

(10) Patent No.: US 9,323,510 B2
(45) Date of Patent: Apr. 26, 2016

(54) ALLOCATING OPTIMIZED RESOURCES FOR COMPONENTS BASED ON DERIVED COMPONENT PROFILES

(75) Inventors: Oleg Koutyrine, Dielheim (DE); Andrey Hoursanov, Mannheim (DE)

(73) Assignee: SAP SE, Walldorf (DE)

( * ) Notice: Subject to any disclaimer, the term of this patent is extended or adjusted under 35 U.S.C. 154(b) by 960 days.

(21) Appl. No.: 13/446,821

(22) Filed: Apr. 13, 2012

(65) Prior Publication Data
US 2013/0275990 A1    Oct. 17, 2013

(51) Int. Cl.
G06F 9/45    (2006.01)
G06F 9/445    (2006.01)
G06F 9/50    (2006.01)

(52) U.S. Cl.
CPC .. *G06F 8/51* (2013.01); *G06F 8/40* (2013.01); *G06F 8/41* (2013.01); *G06F 8/433* (2013.01); *G06F 9/44505* (2013.01); *G06F 9/50* (2013.01); *G06F 2209/501* (2013.01)

(58) Field of Classification Search
None
See application file for complete search history.

(56) References Cited

U.S. PATENT DOCUMENTS

| | | | |
|---|---|---|---|
| 7,448,028 B2 | 11/2008 | Koutyrine et al. | |
| 7,640,497 B1 * | 12/2009 | Black | 715/249 |
| 7,761,865 B2 | 7/2010 | Stienhans et al. | |
| 2004/0172618 A1 * | 9/2004 | Marvin | 717/116 |
| 2004/0172637 A1 | 9/2004 | Koutyrine | |
| 2004/0250257 A1 | 12/2004 | Koutyrine et al. | |
| 2005/0022174 A1 | 1/2005 | Lauterbach et al. | |
| 2009/0313319 A1 * | 12/2009 | Beisiegel et al. | 709/203 |
| 2011/0283273 A1 * | 11/2011 | Peterson et al. | 717/168 |

OTHER PUBLICATIONS

U.S. Appl. No. 13/270,958, filed Oct. 11, 2011, Koutyrine et al.
U.S. Appl. No. 13/271,005, filed Oct. 11, 2011, Koutyrine et al.

* cited by examiner

*Primary Examiner* — Lewis A Bullock, Jr.
*Assistant Examiner* — Mark Gooray
(74) *Attorney, Agent, or Firm* — Fish & Richardson P.C.

(57) ABSTRACT

Systems, methods and techniques relating to publishing mobile applications are described. A described technique includes identifying, at a second component container contained in a first component container, a first component container profile associated with the first component container, translating at least a portion of the first component container profile to a second component container profile associated with the second component container, and initializing the second component container based, at least in part, on the second component container profile.

16 Claims, 5 Drawing Sheets

ALLOCATING OPTIMIZED RESOURCES FOR COMPONENTS BASED ON DERIVED COMPONENT PROFILES

TECHNICAL FIELD

The present disclosure relates to allocating optimized resources for components based on derived component profiles such as, for example, component profiles derived from translated system profiles.

BACKGROUND

In computer science and engineering, a runtime system (also known as a runtime environment or runtime) is designed to support the execution of computer software applications. The runtime system may implement low-level and/or higher-level commands and support type checking, debugging, or even code generation and optimization. The runtime system may be associated with one or more containers. Each container may include one or more contained components. A container may be a web container (also known as a servlet container) or a JavaServer Pages (JSP) container. The web container may be included in a server that interacts with the servlets. In some cases, the web container can implement a component contract of the Java enterprise edition (EE) architecture, specifying a runtime system for web components that includes security, concurrency, lifecycle management, transaction, deployment, and other services. The web container may be responsible for managing the lifecycle of servlets, mapping a uniform resource locator (URL) to a particular servlet and ensuring that the URL requester has the correct access rights.

In many cases, the performance of a runtime system depends on the resources available for utilization of the system. The available resources are typically shared by different components contained in the runtime system. Generally, the greater amount of resource consumed by one component can result in less amount of resource available to another component. The overall performance behavior of the runtime system may be based on the allocation of system resources to the contained components.

SUMMARY

This disclosure provides various implementations of systems, computer program products, and methods for allocating system resources to a component during the initialization process of the component. A described technique includes identifying, at a second component container contained in a first component container, a first component container profile associated with the first component container, translating at least a portion of the first component container profile to a second component container profile associated with the second component container, and initializing the second component container based, at least in part, on the second component container profile.

While generally described as computer program product that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
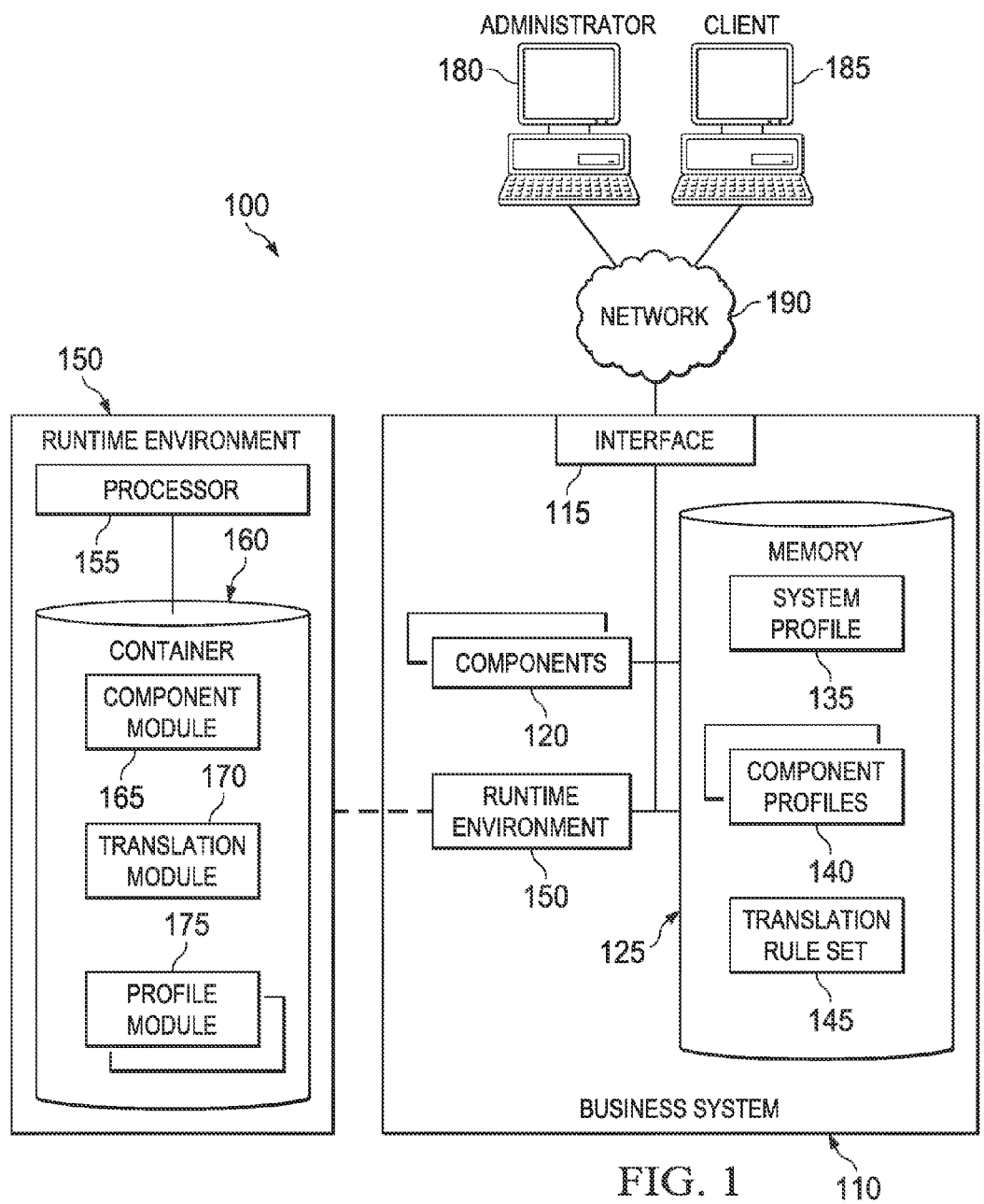
FIG. 1 is a schematic representation of an example system environment suitable for one or more implementations according to the present disclosure.

This disclosure provides details and examples of allocating optimized resources for components based on a component profile derived from a container profile. A computer system is treated, or may be considered, as a composition of software components, at least some of those may play a role of containers, containing other components (see FIG. 4a, 4b). Initialization of components is based on the associated with the component "component profile" representing a set of relevant properties interpreted during the component initialization. Any component may also be a component container. A component container is responsible for translation of at least part of a component profile it gets from its container to profiles for the contained components.

In some aspects, different business systems may expose different system resource usage expectations to system components and/or target users. For example, when a business system is used in a productive scenario, then it is likely that the resource usage expectation of the system is to promote a relatively faster system response time. In such case, more resources may be allocated to the time point where a request comes in order to generate a faster response. On the other hand, when a business system is used for the development of new applications or a development environment, the responsiveness may not be a top priority. Instead, fast system start-up and low hardware resource consumption may be more preferable. In such case, less resources (e.g., cheaper hardware) may be allocated to the system to reduce overhead.

As can be seen from the example set forth above, there may be a conflict in resource allocation strategy according to different system resource usage expectations. In order for a business system developer to know how the system expects the runtime components (e.g., applications, platforms) to use system resources, the developer who uses the runtime system for the development of components may describe the components with some metadata/attributes. The metadata/attributes may provide the components with information in regard to a global performance optimization strategy according to different system expectations. In some implementations, a runtime container that contains the components can be used to translate metadata/attributes into component profiles that are interpretable by the contained components. Based on the component profiles, proper resource allocation and component initialization strategies can be adopted by the components to meet the system resource usage expectation.

While generally described as components contained in a runtime system, components may also be contained in any component container. Furthermore, a component can be contained in a component container, but in the meantime, the component itself can be a component container that includes other components. Therefore, throughout this application, the term "component" is used interchangeably with "component container." Besides allocating optimized resources in a two-layer component-system runtime structure, the various implementations of the present disclosure can be applied to runtime system structure with any number of layers. The foregoing and other features of the present disclosure will become more fully apparent from the following description and the claims.

FIG. 1 is a schematic representation of an example system environment 100 suitable for one or more implementations according to the present disclosure. At a high level, the example system environment 100 includes, or is communicably coupled with, a business system 110, an administrator 180, a client 185 and a network 190.

In the example system environment 100 illustrated in FIG. 1, the business system 110 can include one or more components 120, a runtime environment 150, a memory 125 and an interface 115. Although described as a business system 110 in FIG. 1, the example system environment 100 can include any system that is suitable for implementations according to the present disclosure, including additional, fewer, or alternative systems to those illustrated in FIG. 1.

In some implementations, the business system 110 may be a server. Accordingly, the components 120, runtime environment 150, memory 125 and interface 115 may be included in the server. In general, a server includes an electronic computing device operable to receive, transmit, process, store, or manage data and information associated with the system environment 100. The server may be responsible to communicate with one or more administrators 180 and/or clients 185 to perform one or more business applications. Indeed, the server may be any computer or processing device such as, for example, a blade server, general-purpose personal computer (PC), Macintosh®, workstation, UNIX-based workstation, or any other suitable device. In other words, the present disclosure contemplates computers other than general purpose computers, as well as computers without conventional operating systems. Further, the server may be adapted to execute any operating system, including Linux, UNIX, Windows, Mac OS®, or another suitable operating system.

The business system 110 includes one or more components 120. At a high level, a component 120 may be any application, program, module, process, or other software that may execute, change, delete, generate, or otherwise manage business applications of the business system 110 according to the present disclosure, particularly in response to and in connection with one or more requests received from the client 185, and/or its associated client applications (not shown).

In certain cases, only one component 120 may be located in the business system 110. In others, a plurality of related and/or unrelated components 120 may be stored at a single server, or located across a plurality of other servers associated with the business system 110, as well. In certain cases, the system environment 100 may implement a composite component 120. For example, portions of the composite component 120 may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others.

Additionally, the one or more components 120 may represent web-based applications accessed and executed by remote client 185, administrator 180, other connected components or entities, or remote applications located therein via the network 190 (e.g., through the Internet). Further, while illustrated as internal to the business system 110, one or more processes associated with a particular component 120 may be stored, referenced, or executed remotely. For example, a portion of a particular component 120 may be a web service associated with the component that is remotely called, while another portion of the component 120 may be an interface object or agent bundled for processing at a remote client. Moreover, any or all of the components 120 may be a child or sub-module of another software module or enterprise application (not illustrated) without departing from the scope of this disclosure. Still further, portions of the components 120 may be executed by a user working directly at the business system 110, as well as remotely at a client site.

In some implementations, the components 120 may include one or more servlets. A servlet may be a Java programming language class used to extend the capabilities of servers that host applications' access via a request-response programming model. Although servlets can respond to any type of request, the servlets are commonly used to extend the applications hosted by Web servers.

One or more of the servlets are contained in the container 160 included in the runtime environment 150. A container 160 may be a web container (also known as a servlet container), which is a component of the business system (e.g., web server) 110 that interacts with the one or more servlets. The web container 160 is responsible for managing the lifecycle of servlets, mapping a uniform resource locator (URL) to a particular servlet and ensuring that the URL requester has the correct access rights. In some implementations, a container 160 may further include a SAP NetWeaver® WebDynpro runtime container, a portlet container, or a .Net container, among others.

The business system 110 includes a memory 125 (or database). In general, memory 125 may include any memory or database module and may take the form of volatile or non-volatile memory including, without limitation, magnetic media, optical media, random access memory (RAM), read-only memory (ROM), removable media, or any other suitable local or remote memory component. Memory 125 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the business system 110 and the one or more components 120. Additionally, memory 125 may include any other appropriate data, such as VPN applications, firmware logs and policies, firewall policies, a security or access log, print or other reporting files, as well as others.

In the illustrated example as shown in FIG. 1, the memory 125 includes a system profile 135, one or more component profiles 140 and a translation rule set 145. The system profile 135 may be associated with the runtime environment 150. The system profile 135 may include one or more system profile attributes. Example system profile attributes include a property of the runtime system 150 or a usage scenario description of the runtime system 150. The usage scenario description may describe the runtime system 150 as a productive system, a development system, or a system with other types of usage scenario. The information included in the system profile 135 may be interpretable by an administrator 180 or a client 185 or other entities that have access to the system profile 135. In some implementations, the system profile 135 may be translated to component profiles 140 based on a translation rule set 145.

The translation rule set 145 may include one or more translation rules. In some implementations, the one or more translation rules may be included in the container 160. The one or more translation rules may be used by the container 160 to translate the system profile 135 to component profiles that are interpretable by the corresponding one or more components 120. For example, a container 160 may filter out system profile attributes that are not relevant to the one or more components 120 contained in the container 160 based on the translation rule set 145. The translation rule set 145 may also be used by the container 160 to translate the system profile attributes that are relevant to the one or more components 120 to component profile attributes interpretable by the one or more components 120 contained in the container 160. For example, a system profile attribute, "development system," which describes a system usage scenario of the business system 110 may be translated to a component profile attribute, "no cache," based on the translation rule set. Furthermore, the translation rule set 145 may be modified to adapt to support a smooth migration of application code due to system and/or component updates. For example, in response to a component application code change, the translate rule set 145 may be set to translate "no cache" to "cache_size=0" to be interpretable by the component 120.

The container 160 is included in a runtime environment 150. The container may be a web container, also known as a servlet container. Example web containers can include Apache Tomcat, GlassFish™, and Jetty®. The container 160 may interact directly with one or more components 120 contained in the container based on a component module 165. The component module 165 is responsible for managing the lifecycle of the contained components 120, mapping a URL to a particular component and ensuring that the URL requester has the correct access rights. The container 160 may include a translation module 170 to perform the translation of system profile attributes to component profile attributes, and a profile module 175 to identify system profile attributes based on the system profile 135 and/or compile translated component profile attributes to form component profiles 140.

The runtime environment 150 also includes a processor 155. Although illustrated as a single processor 155 in FIG. 1, two or more processors may be used according to particular needs, desires, or particular embodiments of system environment 100. Each processor 155 may be a central processing unit (CPU), a blade, an application specific integrated circuit (ASIC), a field-programmable gate array (FPGA), or another suitable component. Generally, the processor 155 executes instructions and manipulates data to perform the operations of the business system 110 and, specifically, the one or more components 120. Specifically, the processor 155 executes the functionality required to receive and respond to requests from the administrator 180, the client 185 and/or their respective applications, as well as the functionality required to perform the other operations of the components 120. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java™, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated system environment 100, processor 155 executes one or more components 120 of the business system 110.

Processors 155 suitable for the execution of a computer program include, by way of example, both general and special purpose microprocessors, and any one or more processors of any kind of digital computer. Generally, a processor 155 will receive instructions and data from a read-only memory, a random access memory, or both. The essential elements of a computer are a processor 155 for performing actions in accordance with instructions and one or more memory devices for storing instructions and data. Generally, a computer will also include, or be operatively coupled to receive, data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto optical disks; CD-ROM and DVD-ROM disks. The processor 155 and the database (or memory) 125 can be supplemented by, or incorporated in, special purpose logic circuitry.

As shown in FIG. 1, the business system 110 also includes an interface 115. In general, the interface 115 is used for communicating with other systems in the illustrated example system environment 100 through the network 190. The interface 115 includes logic encoded in software and/or hardware in a suitable combination and operable to communicate with the network 190. More specifically, the interface 115 may comprise software supporting one or more communication protocols associated with communications such that the network 190 or interface's hardware is operable to communicate physical signals within and outside of the illustrated system environment 100. In some instances, the interface's hardware may include wireless transceivers and antennas (not shown). The wireless transceivers can include both the transmitter circuitry and the receiver circuitry. The wireless transceivers may be responsible for up-converting a baseband signal to a passband signal or vice versa. The components of wireless transceivers may include a digital-to-analog converter/analog-to-digital converter, amplifier, frequency filter, and oscillator. The antenna is a transducer which can transmit and/or receive electromagnetic waves. The antenna can convert electromagnetic radiation into electric current, or vice versa. The antenna is generally responsible for the transmission and reception of radio waves, and can serve as the interface between the transceiver and the wireless channel.

The network 190 may be all or a portion of an enterprise or secured network, while in another instance, at least a portion of the network 190 may represent a connection to the Internet. In some instances, a portion of the network 190 may be a virtual private network (VPN). Further, all or a portion of the network 190 can comprise either a wireline or wireless link. Example wireless links may include 802.11a/b/g/n, 802.20, WiMAX®, Bluetooth® and/or any other appropriate wireless link. In other words, the network 190 encompasses any internal or external network, networks, sub-network, or combination thereof operable to facilitate communications between various computing components inside and outside the illustrated environment. The network 190 may communicate, for example, Internet Protocol (IP) packets, Frame Relay frames, Asynchronous Transfer Mode (ATM) cells, voice, video, data, and other suitable information between network addresses. The network 190 may also include one or more local area networks (LANs), radio access networks (RANs), metropolitan area networks (MANs), wide area networks (WANs), all or a portion of the Internet, and/or any other communication system or systems at one or more locations.

The business system 110 is communicably coupled to an administrator 180 via the network 190. The administrator 180 may be a person, an automated system, or an electronic device, responsible for configuring the system profile 135 and/or the components 120. In some instances, the administrator 180 may have a role in the development of the business system 110, one or more components 120, the translation rule set 145, or other particular portions of the illustrated environment 100. The administrator 180 may be located within the business system 110 or remotely from the business system 110. The business system 110 may also be communicably coupled to a client 185 via the network 190. The client 185 may receive one or more business services from the business system 110. The client 185 may also be a developer that performs software development based on the business system 110.

While FIG. 1 is described as containing or being associated with a plurality of elements, not all elements illustrated within system environment 100 of FIG. 1 may be utilized in each alternative implementation of the present disclosure. Additionally, one or more of the elements described herein may be located external to system environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes, in addition to those purposes described herein.

Figure 2:
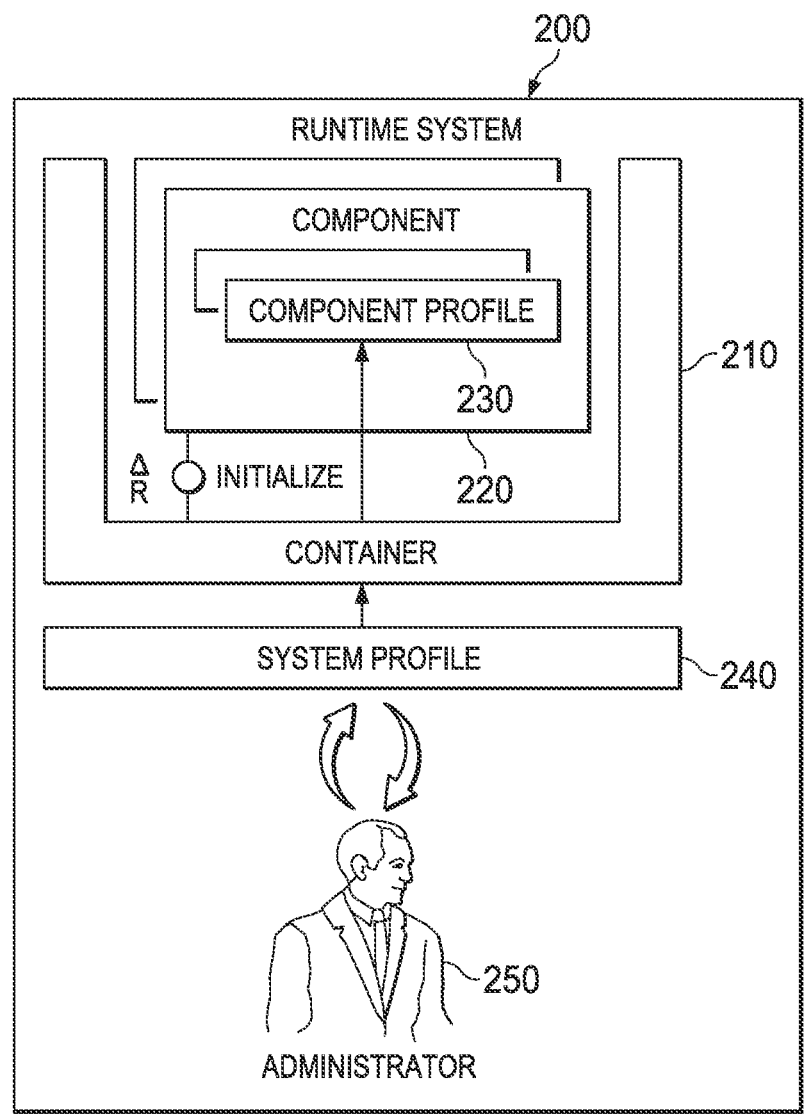
FIG. 2 is a schematic showing an example runtime system, where resources are allocated to a component based on an associated component profile.

FIG. 2 is a schematic showing an example runtime system 200, where resources are allocated to a component based on an associated component profile. The example runtime system 200 includes a container 210, a component 220 contained in the container 210, a component profile 230 associated with the component 220, a system profile 240, and an administrator 250.

The system profile 240 may include one or more attributes of the runtime system 200. For example, the system profile 240 may include information with regard to what type of system the runtime system 200 is (e.g., productive system or development system). The system profiles 240 may be configured by an administrator 250. In some implementations, the administrator 250, system profile 240, and container 210 are located in the runtime system 200. In some other implementations, one or more of those may be located outside of or not directly associated with the runtime system 200.

The administrator 250 may define, maintain, and/or refine the system attributes/parameters included in the system profile 240. The system profile 240 may be a configuration-like system profile (e.g., with a set of fine-grained attributes, or a high-level aggregate such as "development" or "productive"). When the system is a development system, the administrator may define one or more system attributes included in the system profile 240 in accordance with a development system.

The one or more system attributes in accordance with a development system may include, for example, an expression of a minimal consumption of memory, or use of local storage for lowering resource consumption and faster start-up time. When the system is a productive system, the one or more system attributes may include, for example, an expression of initializing cache of the component 220 with sufficient memory, synchronizing the component attributes with the central system frequently, or keeping the connection between the component 220 and internal/external system resources for a high resource consumption, but fast response time.

The system profile 240 may be communicated to the container 210. In some implementations, the system profile 240 may be pushed by the administrator 250 to the container 210, based on a start-up of the runtime system or an update/upgrade of system profile 240 of the runtime system 200. In some other implementations, the system profile 240 may also be pulled by the container 210 based on an initialization of the container 210 or the contained component 220, or by other operations performed by the runtime system 200.

A component profile 230 associated with the component 220 may be derived from the system profile 240 by the container 210. The component profile 230 may include data that is consumable/interpretable by the component 220. The container 210 may interact with the contained component 220 based on one or more contracts. Example contracts may include, for example, 1) the container can ensure access to the component profile 230 for the contained component 220; 2) the contained component 220 can read the component profile 230 from the container 210; and 3) the contained component 220 can access and interpret the component profile 230 to decide on the behavioral aspects of the component 220, the behavioral aspects of the component 220 can include a component initialization strategy, a frequency of backup based on defined Recover-Point Objectives, a logging status of the component container, and a cache size for an execution of the component, among other suitable aspects. For example, errors may be shown as logging status when the runtime system is identified as a productive system, and detailed logging information may be shown when the runtime system is a development system.

The component profile 230 may be translated from the system profile 240 by the container 210, or modified by the container 210 based on one or more translation rules (e.g., the translation rule set 145 illustrated in FIG. 1). In some implementations, the container 210 may first filter out system attributes included in the system profile 240 that are not relevant to the contained component 220. The container 210 may then translate the relevant system attributes to component attributes that are interpretable by the contained component 220. For example, a system attribute value "development system," which indicates that the runtime system 200 is a development system, may be translated to a component attribute value "no cache" that is interpretable by application code of the component 220. In some implementation, the container 210 may also map changed system attributes to component attributes due to a modification of the runtime system 200, the container 210, or the component 220. The modification may be based on a system update/upgrade. For example, when a change of application code associated with the component 220 occurs, the container 210 may translate the component value "no cache" to "cache_size=0" based on the updated application code of the component 220, where the value "no cache" would not be understand or interpretable by the component 220 after the update/upgrade. After the component attributes are derived by the container 210, the container 210 may compile the component attributes to form the component profile 230 to be consumed by the contained component 220. The described filtering and mapping features performed by the container may be considered as specific classes of "transformation rules." In general, the transformations may be performed by a rules engine, e.g., extensible stylesheet language transformations (XSLT), where example operations of the rules engine may include selection, filtering out, mapping, generation, calculation, and aggregation.

In some implementations, the component 220 may be initialized before the component profile 230 is derived from the system profile 240. In such case, the component 220 may be initiated based on one or more default component attributes accessible by the component 220. After the component profile 230 is derived by the container, the component 220 may read the component profile 230 from the container 210, or the container 210 may push the component profile 230 to the component 220 to facilitate component initialization. In some implementation, the component 220 may start initialization based on a component profile 230 provided by the container 210. The component attributes provided by container 210 may include initialization strategy, and/or the amount of system resources to be consumed by the component 220.

Figure 3:
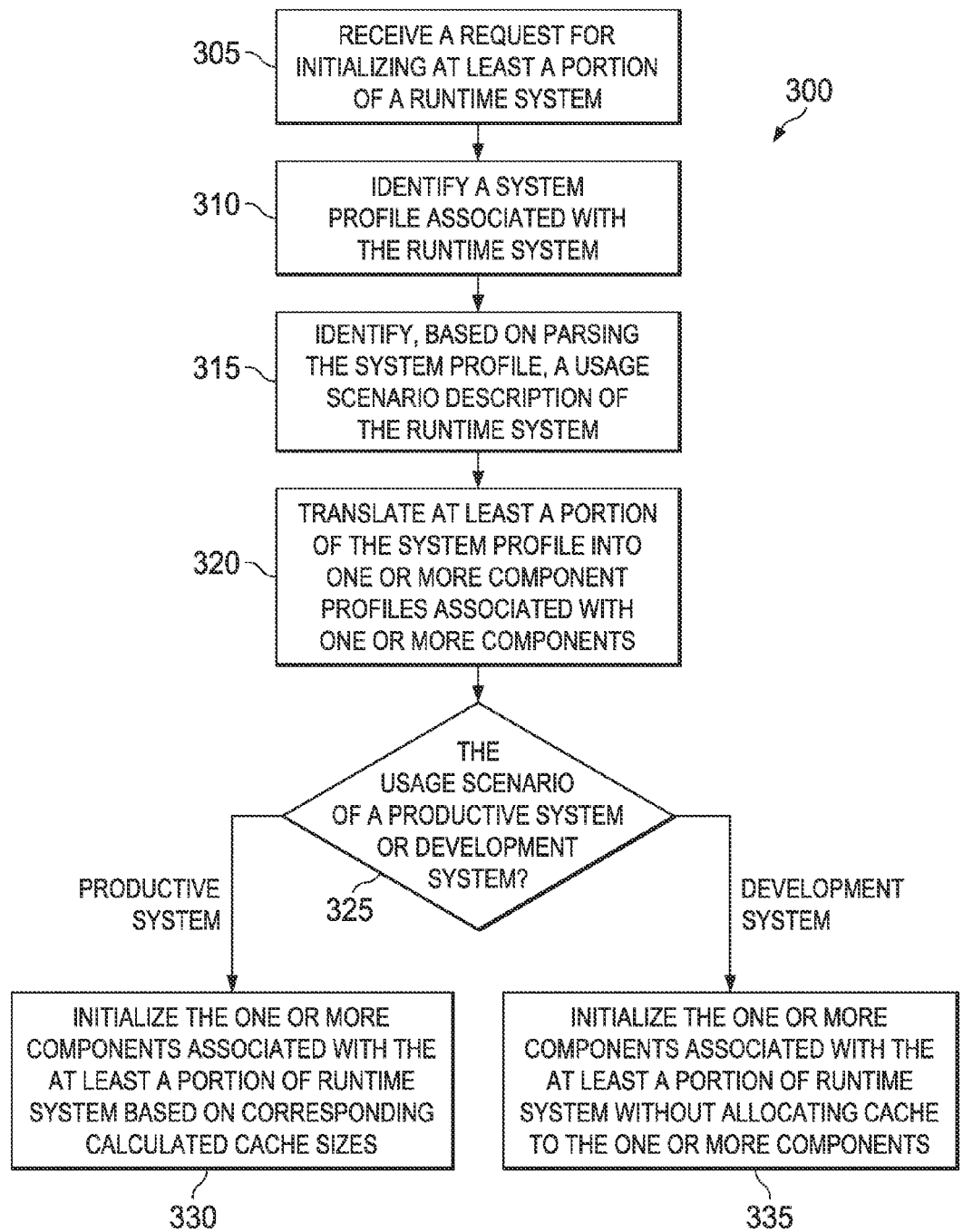
FIG. 3 is a flowchart showing an example process of allocating cache resources for components based on a system usage scenario.

FIG. 3 is a flowchart showing an example process 300 of allocating cache resources for components based on a system usage scenario. The example process 300 may be performed by a container such as the container described in the illustration of FIG. 1 or FIG. 2. In some implementations, the example process 300 may be performed to optimize runtime system performance by attempting to assure and provide balanced resource consumption behavior of components during system initialization and execution. At 305, a request for initializing at least a portion of a runtime system is received. The request for initializing runtime system may be sent by an administrator that configures the system profile of the runtime system, or may be generated by the components, when the initialization of components is on demand.

At 310, a system profile associated with the runtime system is identified. The system profile may be provided by an administrator as described with respect to FIG. 1, or may be dynamically determined based one or more runtime calculations and determinations. In some implementations, the system profile may include features/attributes associated with multiple containers. In such case, identifying the system profile may be based on identifying the portion of the system profile that is known by the container. The portion of the system profile that is known by the container may include system profile attributes associated with the particular container and some common part interpretable by multiple containers. In general, the system profile is expected to be identified on initialization of at least a portion of the runtime system. A chain of control may be performed based on the identified system profile to initialize contained components associated with the container.

At 315, a usage scenario description of the runtime system is identified, based on parsing, analyzing, or reviewing the identified system profile. As described with respect to FIG. 1, the usage scenario description may be, for example, a high level description of the system, such as "productive system" or "development system." In other instances, the usage scenario description may be identified after reviewing, analyzing, and/or translating one or portions of the identified system profile. One or more behavioral aspects of the contained components may be determined based on the usage scenario of the system. The mapping between the one or more behavioral aspects of the contained components and the usage scenario may be based on a set of predetermined/default rules. For example, based on applying the set of rules, if the runtime system is identified as a productive system, the contained components may consume more system resources, and/or spend a relatively long time to start to achieve a fast response time. If the runtime system is a development system, the contained components may be initialized with low memory consumption and fast start-up time.

At 320, at least a portion of the system profile is translated to one or more component profiles associated with one or more components. In some implementations, the runtime system and the components may correspond to different application codes, environments, or languages, such that portions of the system profile may not be interpretable by one or more of the contained components. Therefore, the relevant portions of the system profiles are translated such that they are interpretable by the corresponding contained components. The translation of the system profile to component profile may be based on one or more contracts and/or rules as described with respect to FIG. 2.

At 325, a decision regarding the type of usage scenario of the system (e.g., whether it is a productive system or a development system) is made by the container. If the runtime system is a productive system, the example process 300 proceeds to 330. At 330, the one or more components associated with the at least a portion of runtime system are initialized based on corresponding calculated cache sizes. In some implementations, the cache size for each component may be calculated by the container based on accessing data stored in the runtime system memory. In some other implementations, the cache sizes may be calculated by modules stored locally in the runtime system and provided to the container. If the runtime system is a development system, the example process 300 proceeds to 335. At 335, the contained components are initialized without allocating cache to the contained components.

While FIG. 3 provides two types of usage scenarios, it will be understood that additional or alternative usage scenarios may be also be available and considered. For example, additional usage scenarios could include testing systems, as well as different types of development and productive systems. In other instances, the type of usage scenario may not change how particular component profiles are derived, such that regardless of the particular usage scenario, the same translations of the system profile are performed that result in a particular component profile. Still further, the usage scenario determination may not result in a determination of a particular type of environment, but instead, provide details regarding the runtime system, allowing the container and related logic to determine the appropriate corresponding component profile to generate.

While generally described as components contained in a runtime system 200 in the illustrations of FIG. 2 and FIG. 3, components may also be contained in any component containers. In other words, the "system" as described in the above description is a specific type of "container." Besides a runtime system that has a two-layer component-system structure, the various implementations of the present disclosure can be applied to a runtime system that has any number of container-component layers. For example, a first component container (e.g., a runtime system) can include a second component, the second component itself may be a container that includes a third component, and so on and so forth. The system structure that can apply the various implementations of the present disclosure may be called a "nested" structure, which will become more apparent in the description of FIGS. 4a-b.

Figure 4A:
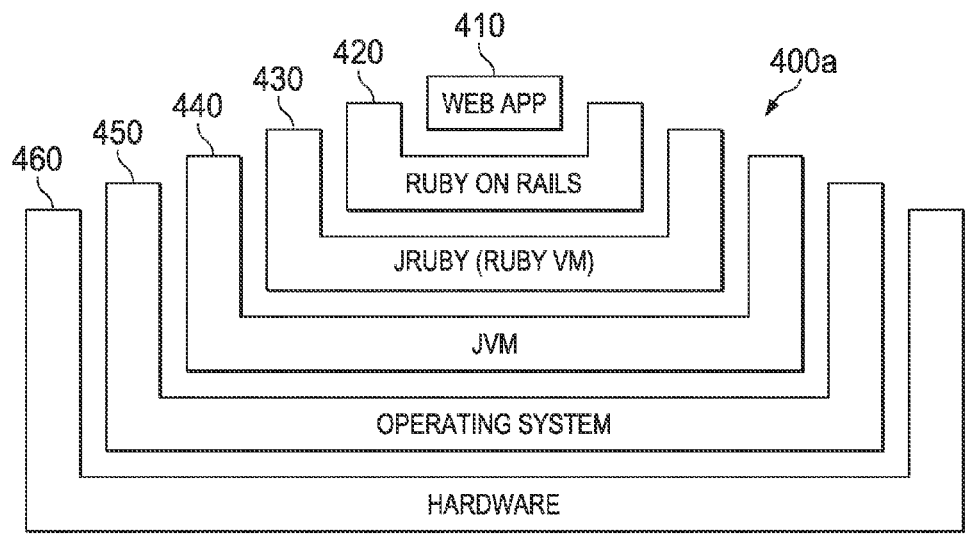
FIG. 4a is a schematic showing an example structure of component containers suitable for one or more implementations according to the present disclosure.

FIG. 4a is a schematic showing an example structure 400a of component containers suitable for one or more implementations according to the present disclosure. In this example, the web application 410 is a component contained in a container "Ruby on Rails" 420. Ruby on Rails is an open source full-stack web application framework for the Ruby programming language. The container "Ruby on Rails" 420 can be contained in a container "JRuby" 430, which is a Ruby virtual machine. The "JRuby" may be a component contained by a Java™ virtual machine (JVM®) 440. The JVM® 440 may be contained in an operation system (OS) 450, and the OS may be contained in a hardware 460 component of a runtime system.

Figure 4B:
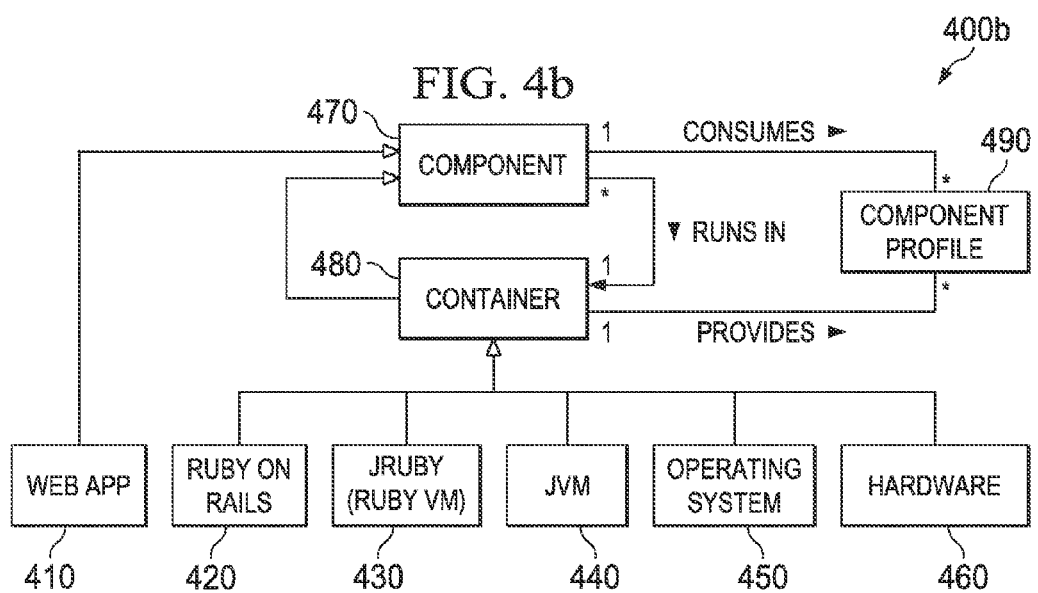
FIG. 4b is a schematic showing example relationships of component containers according to the present disclosure.

FIG. 4b is a schematic showing example relationships 400b of component containers according to the present disclosure. As illustrated in FIG. 4b, example components 470 that can in turn be component containers 480 can comprise any runtime system component including web applications 310, "Ruby on Rails" 420, JRuby 430, JVM 430, OS 450, and hardware 460. When operating as component containers 480, the containers can provide for its contained component functionalities including lifecycle management, and providing programming models and component profiles. When operating as component profile 470, the component can run in containers 480, and consume component profile 490 for optimized resource allocation information based on one or more component containers in which the component is contained. Multiple levels of containers and components may be realized in various implementations, with component profiles 490 being passed to, shared with, and interpreted by a plurality of component containers in which a nested relationship exists. The component profile can therefore by propagated between a nested chain of containers. The component or container profiles may be transformed for one or more of the nested chain of containers.

Figure 5:
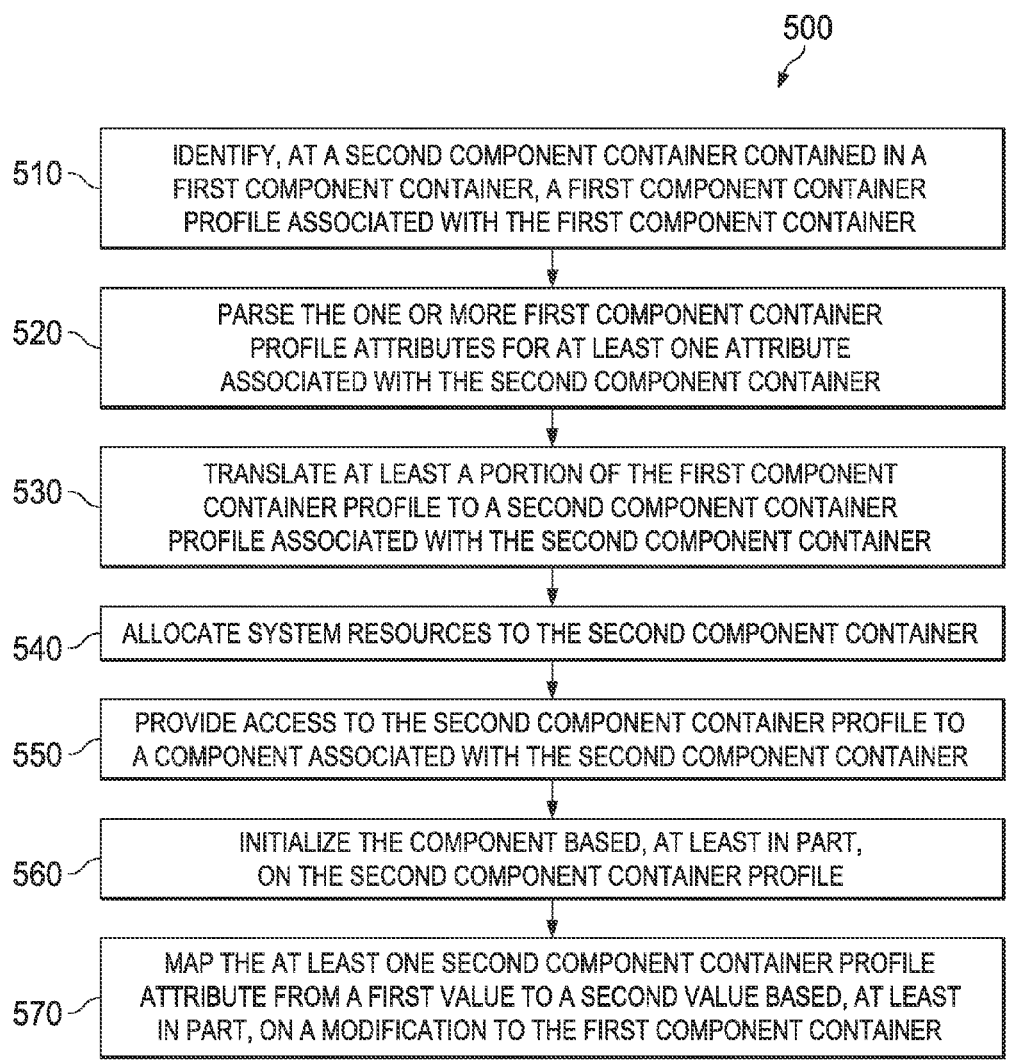
FIG. 5 is a flowchart showing an example process of initializing a component container based on a component profile associated with the component container.

FIG. 5 is a flowchart showing an example process 500 of initializing a component container based on a component profile associated with the component container. In some implementations, the example process 500 may be performed by a container, such as the container described with respect FIGS. 1-4. Similar to the example process 300 described with respect to FIG. 3, the example process 400 may be performed to optimize runtime system performance by assuring balanced resource consumption behavior of components during system initialization.

At 510, a second component container contained in a first component container identifies a first component container profile associated with the first component container. In some implementations, the first component container is a runtime, and the first component container profile is the system profile. In such case, the system profile may include metadata and/or attributes provided by an administrator or developer that define a system resource usage expectation. Alternatively, the first component container may be a nested component within the runtime (e.g., JVM 430), and the first component container profile may be a component profile propagated from a component within which the first component container is nested. At 520, the second component container parses one or more first component container profile attributes for at least one attribute associated with the second component container. At 530, the second component container translates at least a portion of the first component container profile to a second component container profile associated with the second component container.

At 540, the second component container allocates system resources to the second component container. The second component container profile may be derived from the first component container profile based on one or more predetermined contracts/rules, such that the component profile is interpretable by the second component container. The second component container profile may ensure that the component behavior is regulated according to the expectation of the first component container. At 550, the second component container provides access to the second component container profile to a component associated with the second component container.

At 560, the second component container initializes the component based, at least in part, on the second component container profile. When there is a modification to the system and/or the component, the example process may proceed to 570. At 570, the second component container maps the at least one second component container profile attribute from a first value to a second value based, at least in part, on a modification to the first component container. The modification may be an upgrade/update of the first component container and/or the component that alters the attributes or application code.

While this specification contains many specific implementation details, these should not be construed as limitations on the scope of any that may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described components and systems can generally be integrated together in a single product or packaged into multiple products.

In the present disclosure, "each" refers to each of multiple items or operations in a group, and may include a subset of the items or operations in the group and/or all of the items or operations in the group. In the present disclosure, the term "based on" indicates that an item or operation is based at least in part on one or more other items or operations and may be based exclusively, partially, primarily, secondarily, directly, or indirectly on the one or more other items or operations.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A method performed by a component container in a runtime environment, comprising:
    identifying, at a second component container contained in a first component container, a first component container profile associated with the first component container, the first component container profile including a set of attributes, wherein the first component container is a runtime system;

translating at least a portion of the first component container profile to a second component container profile associated with the second component container, wherein translating includes, prior to initializing a component contained in the second component container:
identifying, from the first component container profile, a first set of attributes relevant to the second component container, wherein identifying the first set of attributes relevant to the second component container includes parsing the set of attributes in the first component container profile to identify a usage scenario of the first component container, wherein the usage scenario is either a productive system or a development system;
filtering out, from the first component container profile, a second set of attributes irrelevant to the second component container;
translating the first set of attributes to a third set of attributes based on a translation rule set, the third set of attributes interpretable by the second component container, wherein translating the first set of attributes to the third set of attributes is based on a translation rule set corresponding to the identified usage scenario; and
compiling the translated third set of attributes into the second component container profile for use by the second component container; and
initializing the component contained in the second component container based, at least in part, on the compiled second component container profile, and wherein initializing the component includes allocating more system resources to the component when the usage scenario is the productive system than when the usage scenario is the development system.

2. The method of claim 1, set of attributes in the first component container profile comprises at least one of the following: a property of the first component container, a usage scenario description of the first component container, or a property to be consumed by at least one of components directly or indirectly contained in the first component container.

3. The method of claim 1, wherein translating the first component container profile to the second component container profile further includes mapping at least one attribute in the second component container profile from a first value to a second value based, at least in part, on a modification to the first component container.

4. The method of claim 3, wherein the modification to the first component container includes at least one upgrade of at least a portion of the first component container, an update of at least a portion of the first component container, or a modification to the second component container included in the first component container.

5. The method of claim 1, wherein initializing the component is further based on one or more default attributes associated with the second component container.

6. The method of claim 1, wherein the second component container profile includes information descriptive of at least one of behavioral aspects for initializing the second component container, and wherein the behavioral aspects include at least one of a component initialization strategy, a frequency of backup of the second component container, a logging status of the second component container, or a cache size for an execution of the second component container.

7. The method of claim 1, wherein initializing the component contained in the second component container further includes allocating system resources to the component contained in the second component container.

8. The method of claim 1, wherein initializing the component contained in the second component container further includes providing access to the second component container profile to the component contained in the second component container.

9. The method of claim 1, wherein the second component container is a component nested within the first component container.

10. The method of claim 1, further comprising:
identifying, at a third component container nested within the second component container, a second component container profile associated with the second component container;
translating at least a portion of at least one of the second component container profile or the first component container profile to a third component container profile associated with the third component container; and
initializing a second component associated with the third container based, at least in part, on the third component container profile.

11. A computer program product comprising computer-readable instructions embodied on tangible, non-transient media, the computer program product operable when executed to:
identify, at a second component container contained in a first component container, a first component container profile associated with the first component container, the first component container profile including a set of attributes, wherein the first component container is a runtime system;
translate at least a portion of the first component container profile to a second component container profile associated with the second component container, wherein translating includes, prior to initializing a component contained in the second component container:
identifying, from the first component container profile, a first set of attributes relevant to the second component container, wherein identifying the first set of attributes relevant to the second component container includes parsing the set of attributes in the first component container profile to identify a usage scenario of the first component container, wherein the usage scenario is either a productive system or a development system;
filtering out, from the first component container profile, a second set of attributes irrelevant to the second component container;
translating the first set of attributes to a third set of attributes based on a translation rule set, the third set of attributes interpretable by the second component container, wherein translating the first set of attributes to the third set of attributes is based on a translation rule set corresponding to the identified usage scenario; and
compiling the translated third set of attributes into the second component container profile for use by the second component container; and
initialize the component contained in the second component container based, at least in part, on the compiled second component container profile, and wherein initializing the component includes allocating more system resources to the component when the usage scenario is the productive system than when the usage scenario is the development system.

12. The product of claim 11, wherein the set of attributes in the first component container profile comprises at least one of the following: a property of the first component container, a usage scenario description of the first component container, or a property to be consumed by at least one of components directly or indirectly contained in the first component container.

13. The product of claim 11, wherein translating the first component container profile to the second component container profile further includes mapping at least one attribute in the second component container profile from a first value to a second value based, at least in part, on a modification to the first component container.

14. The product of claim 11, wherein initializing the component is further based on one or more default attributes associated with the second component container.

15. The product of claim 11, wherein the second component container is a component nested within the first component container.

16. A system comprising:
  one or more computers; and
  a computer-readable medium coupled to the one or more computers having instructions stored thereon which, when executed by the one or more computers, cause the one or more computers to perform operations comprising:
    identifying, at a second component container contained in a first component container, a first component container profile associated with the first component container, the first component container profile including a set of attributes, wherein the first component container is a runtime system;
    translating at least a portion of the first component container profile to a second component container profile associated with the second component container, wherein translating includes, prior to initializing a component contained in the second component container:
      identifying, from the first component container profile, a first set of attributes relevant to the second component container, wherein identifying the first set of attributes relevant to the second component container includes parsing the set of attributes in the first component container profile to identify a usage scenario of the first component container, wherein the usage scenario is either a productive system or a development system;
      filtering out, from the first component container profile, a second set of attributes irrelevant to the second component container;
      translating the first set of attributes to a third set of attributes based on a translation rule set, the third set of attributes interpretable by the second component container, wherein translating the first set of attributes to the third set of attributes is based on a translation rule set corresponding to the identified usage scenario; and
      compiling the translated third set of attributes into the second component container profile for use by the second component container; and
    initializing the component contained in the second component container based, at least in part, on the compiled second component container profile, and wherein initializing the component includes allocating more system resources to the component when the usage scenario is the productive system than when the usage scenario is the development system.

* * * * *